United States Patent [19]

Turner

[11] Patent Number: 4,512,746

[45] Date of Patent: Apr. 23, 1985

[54] MATHEMATICAL TEACHING CARDS

[76] Inventor: Donald Turner, 16 Bradley Ct., Rockville, Md. 20851

[21] Appl. No.: 418,203

[22] Filed: Sep. 15, 1982

[51] Int. Cl.³ .......................... G09B 19/02; A63F 1/00
[52] U.S. Cl. .................................... 434/209; 273/299; 273/302
[58] Field of Search ..................... 434/191, 208, 209; 273/299, 302, 308

[56] References Cited

U.S. PATENT DOCUMENTS

| | | | |
|---|---|---|---|
| 133,296 | 11/1872 | Bradley | 273/308 |
| 1,146,808 | 7/1915 | Miller | 273/292 |
| 1,273,864 | 7/1918 | Johnson | 273/308 X |
| 1,292,184 | 1/1919 | Wells | 273/302 X |
| 1,305,949 | 6/1919 | Stouffer et al. | 273/308 X |
| 1,354,707 | 10/1920 | Waterhouse | 273/302 X |
| 1,381,643 | 6/1921 | Jourdan | 273/302 |
| 1,417,434 | 5/1922 | Weiss | 273/302 |
| 1,599,568 | 9/1926 | Koehler | 273/308 |
| 1,666,996 | 4/1928 | Douglas | 273/302 X |
| 2,154,891 | 4/1939 | Dodge | 273/302 X |
| 2,205,440 | 6/1940 | Schoenberg et al. | 434/209 X |
| 2,607,595 | 8/1952 | Mathes | 273/302 |
| 2,769,640 | 11/1956 | Elder | 434/209 X |
| 3,143,348 | 8/1964 | Carsen et al. | 273/302 X |
| 3,627,325 | 12/1971 | Breslow | 273/308 X |
| 3,935,651 | 2/1976 | Mankoff et al. | 273/302 |
| 4,234,189 | 11/1980 | Chunn | 273/302 X |

FOREIGN PATENT DOCUMENTS

| | | | |
|---|---|---|---|
| 2258214 | 6/1973 | Fed. Rep. of Germany | 434/191 |
| 857260 | 4/1940 | France | 434/209 |

Primary Examiner—William H. Grieb
Attorney, Agent, or Firm—Wegner & Bretschneider

[57] ABSTRACT

A series of mathematical teaching cards consisting of a plurality of decks each having a level of difficulty identification, a plurality of sets of mathematical statements having the same answer, and a deck identification number is disclosed and described. The teaching cards may be used for multiplication, division, subtraction, and addition or any combination thereof.

6 Claims, 2 Drawing Figures

FIG. 1
BACK FACE
DECKS 1,2,3,4   DECKS 5,6,7,8   DECKS 9,10,11,12
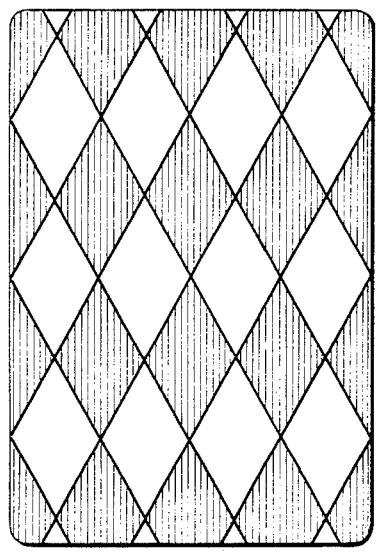 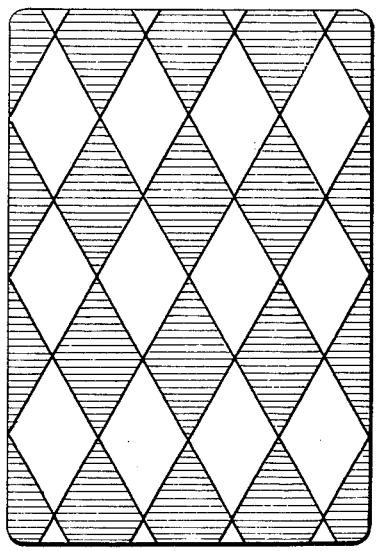 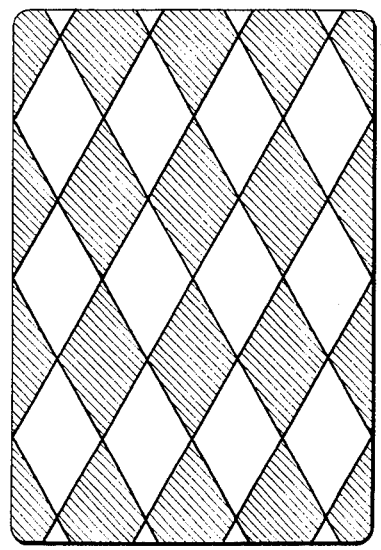
FIG. 2
FRONT FACE
DECK 6    ANSWER - SET 24
| 12 x 2  6 | 3 x 8  6 | 4 x 6  6 |
|            |           |           |
| 9  12x2   | 9  3x8    | 9  4x6    |

MATHEMATICAL TEACHING CARDS

BACKGROUND OF THE INVENTION

1. Field of the Invention

In the teaching of mathematics to beginning students, learning disabled children, and others having difficulty with mastering the concepts and rules of mathematics it is desirable to present the material in an enjoyable and successful manner. Traditional methods of teaching such as memorization of multiplication tables, basic addition facts, basic subtraction facts, and division facts in many instances has been very difficult for both the student and teacher.

It is therefore desirable to have a method of teaching and learning basic mathematical relationships which is less tedious than the traditional methods, and which is an enjoyable experience for the student. It is further desirable to have a method which provides measurable success for both the student and teacher. Finally, it is desirable to have a method of teaching which will provide the teacher with an alternative to the traditional method and which will allow a successful experience for both the teacher and the student.

2. Description of the Prior Art

French Pat. No. 857,260, published in 1940 discloses the use of two decks of cards, one deck having problem statements and the other having answers to be compared to the problem statement cards. The subject invention is a substantial departure from the French Pat. No. 857,260 because in this invention is is necessary for the user to know the answers to a plurality of problem statements in order to play a game by matching problem statements. In contrast, the French Pat. No. 857,260 requires only matching of a single problem statement with answer cards. Applicant's invention by eliminating answer cards adds a high degree of sophistication and complexity to the process of teaching mathematical principles through the use of cards.

U.S. Pat. No. 1,354,707 is another card game used to assist in the instruction of mathematics which like the French patent includes both problem statements and answers. In this game, the primary face of the card shown at the left hand of FIG. 1 of the U.S. Pat. No. 1,354,707 patent is the problem statement, and the other side (right side of FIG. 1) contains the answers to the problem statements. This is nothing more than the traditional flash cards with problems on one side and answers on the other. Since applicant's invention does not utilize answers, and only uses one side of the card for problem statements it is a radical departure from this prior art patent.

In addition to the above mathematical games, there is found in the prior art numerous card games used for teaching other concepts. These include: U.S. Pat. No. 2,607,595 which is a game based upon the traditional deck of cards and the electoral voting system; U.S. Pat. No.1,146,808 which is used for language instruction; U.S. Pat. No. 1,292,184 which is used for teaching facts relating to United States geography; U.S. Pat. No. 1,273,864 which is used to teach about authors; U.S. Pat. No. 133,296 which is used to teach about authors; U.S. Pat. No. 2,154,891 which is used to teach knots; U.S. Pat. No. 1,305,949 which is used to teach about bones; U.S. Pat. No. 3,935,651 which is used to instruct vocabulary, U.S. Pat. No. 1,381,643 which is used to instruct about presidents of the United States; U.S. Pat. No. 1,666,996 which is used to instruct geometry, U.S. Pat. No. 1,417,434 which is used to instruct states and their capitals, U.S. Pat. No. 4,234,189 which is used to play a game forming words; U.S. Pat. No. 3,143,348 which is based upon vocabulary, and U.S. Pat. No. 3,627,325 which requires the matching of illustrated articles with smells. The above art includes answer cards, and does not involve matching of problem statements with problem statements.

3. Unpublished Work Copyright Registration

The invention described in this patent application was in part described in material that was registered as an unpublished work with the Copyright Office on Oct. 19, 1979. The registration was in the name of "Multi-fish" and the registration number is TXU 32-942. The actual cards with instructions for use were first published and sold in December 1981. In view of the Copyright Office cryptic identification of "Multi-fish" the invention could not have become known to the public, and it was not described in a printed publication until it was actually published and sold in December 1981.

SUMMARY OF THE INVENTION

1. Brief Description

This invention uses a plurality of cards in a deck which consist of different problem statements upon each card. Groups of cards or decks have a plurality of sets of cards wherein each card of a set is a mathematical statement which has the same answer as the other cards in the set. The object of a game which is played with the cards is to assemble sets of cards which have the same answer to their mathematical statements. In order to accommodate many different mathematical statements, a plurality of decks may be used. The mathematical statements may be multiplication statements, addition statements, subtraction statements, division statements or any other mathematical relationship having an equivalent answer. In this disclosed embodiment, all of the statements are multiplication problems.

2. Objects and Advantages of the Invention

This invention provides a unique approach to teaching and learning of mathematical tables and principles.

It is an object of this invention to provide teachers with an improved approach to teaching mathematics to all types of students, and particularly learning disabled students.

It is an object of this invention to provide students with an enjoyable approach to learning mathematics which will facillitate the learning process.

It is an object of this invention to teach the student the inter-relationships between different multiplication facts, between multiplication and division facts, and between the facts of the four basic mathematical operations which are addition, subtraction, multiplication and division.

It is an object of this invention to require the student to know the basic facts about mathematical relationships and problem statements without having before him answer cards which will aid him in the use of the cards and provide a source of guesses or a learning crutch.

BRIEF DESCRIPTION OF THE DRAWINGS

FIG. 1 shows the back faces of three groups of decks of cards, which are identified by their colors.

FIG. 2 shows the front face of a typical set of three multiplication mathematical statements, each having the same answer.

DETAILED DESCRIPTION OF THE PREFERRED EMBODIMENT

The back face of the cards is depicted in FIG. 1, and consists of three colors used to identify the three different levels of mathematical difficulty. In the preferred embodiment there are 3 levels each having 4 separate decks of cards, or 12 decks in all. In the decks associated with the 1,2,3, and 4 times tables are considered to be the easiest level, the decks associated with the 5,6,7, and 8 times tables are considered to be the intermediate level, and the decks associated with the 9, 10, 11, and 12 times tables are considered to be the most difficult. In the example of multiplication learning cards, there are 12 decks each having 36 cards, or a total of 432 cards in all.

Table 1 set forth here in below lists the mathematical statements which are on each of the cards in the 12 decks used for multiplication teaching.

ent mathematical concepts such as addition, subtraction, and division. Still further, tables may be developed which use problem statements from two or more of the different mathematical concepts. It is also possible to create cards with higher mathematical relationships such as trigonometry functions and the like.

FIG. 2 shows the front face of three cards from Deck 6 whose mathematical statements are respectively $12\times2$, $3\times8$, and $4\times6$. The answer 24 is not placed on any card so that the player is required to know that 24 is the answer to each statement in order to be able to play with these cards. This requirement is the drill and conceptual exercise which makes learning successful with these cards.

The Deck number is also placed upon the face of the card so that the 12 decks can be easily kept together. In the example of FIG. 2, the $12\times2$, $4\times6$, and $8\times3$ problem statements for the answer 24 in Deck 6 is also found in decks 8, and 12 as set forth in Table 1 above. For this reason deck numbers are required to keep each deck seperate. It should be noted the Decks 6 and 8 are both in the intermediate level of difficulty and that they

TABLE 1

| (1) | | | | (2) | | | | (3) | | | |
|---|---|---|---|---|---|---|---|---|---|---|---|
| | $1\times1$ | $1\times1$ | $1\times1$ | | $2\times1$ | $1\times2$ | $2\times1$ | | $3\times1$ | $1\times3$ | $3\times1$ |
| | $1\times2$ | $2\times1$ | $1\times2$ | | $2\times2$ | $4\times1$ | $2\times2$ | | $3\times2$ | $6\times1$ | $3\times2$ |
| | $1\times3$ | $3\times1$ | $1\times3$ | | $2\times3$ | $6\times1$ | $3\times2$ | | $3\times3$ | $1\times9$ | $9\times1$ |
| | $1\times4$ | $4\times1$ | $1\times4$ | | $2\times4$ | $8\times1$ | $4\times2$ | | $3\times4$ | $2\times6$ | $12\times1$ |
| | $1\times5$ | $5\times1$ | $1\times5$ | | $2\times5$ | $10\times1$ | $5\times2$ | | $3\times5$ | $5\times3$ | $5\times3$ |
| | $1\times6$ | $6\times1$ | $1\times6$ | | $2\times6$ | $3\times2$ | $12\times1$ | | $3\times6$ | $9\times2$ | $6\times3$ |
| | $1\times7$ | $7\times1$ | $1\times7$ | | $2\times7$ | $7\times2$ | $2\times7$ | | $3\times7$ | $7\times3$ | $3\times7$ |
| | $1\times8$ | $8\times1$ | $1\times8$ | | $2\times8$ | $4\times4$ | $8\times2$ | | $3\times8$ | $12\times2$ | $4\times6$ |
| | $1\times9$ | $9\times1$ | $1\times9$ | | $2\times9$ | $6\times3$ | $3\times6$ | | $3\times9$ | $9\times3$ | $3\times9$ |
| | $1\times10$ | $10\times1$ | $1\times10$ | | $2\times10$ | $4\times5$ | $5\times4$ | | $3\times10$ | $5\times6$ | $10\times3$ |
| | $1\times11$ | $11\times1$ | $1\times11$ | | $2\times11$ | $11\times2$ | $2\times11$ | | $3\times11$ | $11\times3$ | $3\times11$ |
| | $1\times12$ | $12\times1$ | $1\times12$ | | $2\times12$ | $8\times3$ | $4\times6$ | | $3\times12$ | $4\times9$ | $12\times3$ |
| (4) | $4\times1$ | $1\times4$ | $4\times1$ | (5) | $5\times1$ | $1\times5$ | $5\times1$ | (6) | $6\times1$ | $3\times2$ | $2\times3$ |
| | $4\times2$ | $2\times4$ | $2\times4$ | | $5\times2$ | $2\times5$ | $1\times10$ | | $6\times2$ | $3\times4$ | $12\times1$ |
| | $4\times3$ | $3\times4$ | $4\times3$ | | $5\times3$ | $3\times5$ | $5\times3$ | | $6\times3$ | $9\times2$ | $3\times6$ |
| | $4\times4$ | $8\times2$ | $4\times4$ | | $5\times4$ | $4\times5$ | $2\times10$ | | $4\times6$ | $3\times8$ | $12\times2$ |
| | $4\times5$ | $10\times2$ | $5\times4$ | | $5\times5$ | $5\times5$ | $5\times5$ | | $6\times5$ | $3\times10$ | $5\times6$ |
| | $4\times6$ | $3\times8$ | $4\times6$ | | $5\times6$ | $3\times10$ | $6\times5$ | | $6\times6$ | $4\times9$ | $3\times12$ |
| | $4\times7$ | $7\times4$ | $4\times7$ | | $5\times7$ | $7\times5$ | $5\times7$ | | $6\times7$ | $7\times6$ | $7\times6$ |
| | $4\times8$ | $8\times4$ | $8\times4$ | | $5\times8$ | $10\times4$ | $8\times5$ | | $6\times8$ | $12\times4$ | $8\times6$ |
| | $4\times9$ | $3\times12$ | $9\times4$ | | $5\times9$ | $9\times5$ | $5\times9$ | | $6\times9$ | $9\times6$ | $6\times9$ |
| | $4\times10$ | $5\times8$ | $10\times4$ | | $5\times10$ | $10\times5$ | $5\times10$ | | $6\times10$ | $5\times12$ | $10\times6$ |
| | $4\times11$ | $11\times4$ | $4\times11$ | | $5\times11$ | $11\times5$ | $5\times11$ | | $6\times11$ | $11\times6$ | $11\times6$ |
| | $4\times12$ | $6\times8$ | $12\times4$ | | $5\times12$ | $6\times10$ | $12\times5$ | | $6\times12$ | $8\times9$ | $12\times6$ |
| (7) | $7\times1$ | $1\times7$ | $7\times1$ | (8) | $8\times1$ | $2\times4$ | $1\times8$ | (9) | $9\times1$ | $1\times9$ | $9\times1$ |
| | $7\times2$ | $2\times7$ | $7\times2$ | | $8\times2$ | $4\times4$ | $2\times8$ | | $9\times2$ | $6\times3$ | $2\times9$ |
| | $7\times3$ | $3\times7$ | $7\times3$ | | $8\times3$ | $4\times6$ | $12\times2$ | | $9\times3$ | $3\times9$ | $9\times3$ |
| | $7\times4$ | $4\times7$ | $7\times4$ | | $8\times4$ | $4\times8$ | $8\times4$ | | $9\times4$ | $12\times4$ | $6\times6$ |
| | $7\times5$ | $5\times7$ | $7\times5$ | | $8\times5$ | $10\times4$ | $5\times8$ | | $9\times5$ | $5\times9$ | $9\times5$ |
| | $7\times6$ | $6\times7$ | $7\times6$ | | $8\times6$ | $12\times4$ | $6\times8$ | | $9\times6$ | $6\times9$ | $9\times6$ |
| | $7\times7$ | $7\times7$ | $7\times7$ | | $8\times7$ | $7\times8$ | $8\times7$ | | $9\times7$ | $7\times9$ | $9\times7$ |
| | $7\times8$ | $8\times7$ | $7\times8$ | | $8\times8$ | $8\times8$ | $8\times8$ | | $9\times8$ | $6\times12$ | $8\times9$ |
| | $7\times9$ | $9\times7$ | $7\times9$ | | $8\times9$ | $6\times12$ | $12\times6$ | | $9\times9$ | $9\times9$ | $9\times9$ |
| | $7\times10$ | $10\times7$ | $7\times10$ | | $8\times10$ | $10\times8$ | $8\times10$ | | $9\times10$ | $10\times9$ | $9\times10$ |
| | $7\times11$ | $11\times7$ | $7\times11$ | | $8\times11$ | $11\times8$ | $8\times11$ | | $9\times11$ | $11\times9$ | $9\times11$ |
| | $7\times12$ | $12\times7$ | $7\times12$ | | $8\times12$ | $12\times8$ | $12\times8$ | | $9\times12$ | $12\times9$ | $9\times12$ |
| (10) | $10\times1$ | $5\times2$ | $2\times5$ | (11) | $11\times1$ | $1\times11$ | $11\times1$ | (12) | $12\times1$ | $3\times4$ | $2\times6$ |
| | $10\times2$ | $4\times5$ | $5\times4$ | | $11\times2$ | $2\times11$ | $11\times2$ | | $12\times2$ | $3\times8$ | $4\times6$ |
| | $10\times3$ | $5\times6$ | $3\times10$ | | $11\times3$ | $3\times11$ | $11\times3$ | | $12\times3$ | $4\times9$ | $3\times12$ |
| | $10\times4$ | $5\times8$ | $4\times10$ | | $11\times4$ | $4\times11$ | $11\times4$ | | $12\times4$ | $6\times8$ | $4\times12$ |
| | $10\times5$ | $5\times10$ | $10\times5$ | | $11\times5$ | $5\times11$ | $11\times5$ | | $12\times5$ | $6\times10$ | $5\times12$ |
| | $10\times6$ | $5\times12$ | $6\times10$ | | $11\times6$ | $6\times11$ | $11\times6$ | | $12\times6$ | $9\times8$ | $6\times12$ |
| | $10\times7$ | $7\times10$ | $10\times7$ | | $11\times7$ | $7\times11$ | $11\times7$ | | $12\times7$ | $7\times12$ | $12\times7$ |
| | $10\times8$ | $8\times10$ | $10\times8$ | | $11\times8$ | $8\times11$ | $11\times8$ | | $12\times8$ | $8\times12$ | $12\times8$ |
| | $10\times9$ | $9\times10$ | $10\times9$ | | $11\times9$ | $9\times11$ | $11\times9$ | | $12\times9$ | $9\times12$ | $12\times9$ |
| | $10\times10$ | $10\times10$ | $10\times10$ | | $11\times10$ | $10\times11$ | $11\times10$ | | $12\times10$ | $10\times12$ | $12\times10$ |
| | $10\times11$ | $11\times10$ | $10\times11$ | | $11\times11$ | $11\times11$ | $11\times11$ | | $12\times11$ | $11\times12$ | $12\times11$ |
| | $10\times12$ | $12\times10$ | $10\times12$ | | $11\times12$ | $12\times11$ | $11\times12$ | | $12\times12$ | $12\times12$ | $12\times12$ |

As can be seen from Table 1, there are 3 cards with the same answer, and 12 sets which make up one deck of the cards. The cards within a deck which have the same answer are referred to as a set. In the use of this invention, many different tables may be developed for differtherefore have the same colored back face.

In some forms of teaching with levels, Decks, sets, and cards of this invention it may be desirable to use answer sheets or cards giving correct problem statements and answers before the student player or learner has become proficient. In another form of teaching, answer cards may be provided, and they may be used to teach fundamental relationships in the manner taught by French Pat. No. 857,260 as disclosed above. It should be noted that although answers may be used for initial learning, they are not to be used with the cards of this invention once the student has become some what proficient.

The preferred teaching game to be used with the cards of this invention utilizes the principles of the common childs card game known as "fish". Playing with one deck of cards initially; seven cards are dealt out to two or more players. The person on the left of the dealer begins play by asking the person on his left for all of the cards whose answer is the same as one or more of the cards the asker already has in his hand. A statement such as "give me all of your 24's" would request the cards from FIG. 2 of the drawings. If the card requested is not present in the hand of the person to the left of the requestor, the requestor must draw from a pile of face down cards. If the card requested is picked up from the pile or is given to the requestor, the requestor has earned another turn and may make another request for a card from the person on his left. When sets of 3 cards having the same answer are obtained, a player may place them face up on the board and they will then become a contribution to his score as it is kept between the players. When the game has progressed until there are no more cards in the pile, the person requesting a card must ask each player in turn until the desired cards are obtained and the players are out of cards. The player with the most cards in sets before him is the winner of the game.

In teaching mathematical skills, it is possible that a player will not know the answer for the statement of the card he wishes to request others to match. In this case he may say: give me all of your 6×4's.

If an asked player does not know all of the statements that yield the requested answer, the requestor must state all possible combinations that will give the answer.

In the last two examples of play, it is assumed that at least one player knows the correct answers to the statements on the cards.

In the preferred embodiment of the invention multiplication problem statements are used to make up the decks and levels of difficulty of this teaching game. However, the cards may be made up of addition, subtraction, and division statements which will teach these other skills. Still further, there may be a mixture of addition, subtraction, multiplication, and division with each deck within a chosen skill level. In this manner many mathematical relationships can be taught by cards with different skill levels, a number of decks within each skill level, and sets of problem statements which have the same answer.

What is claimed is:

1. A series of multiplication table teaching cards having a plurality of decks of cards, each card having a front side and a back side, and each deck having;

a different subgroup of multiplication statements, a plurality of sets of cards within each deck, each set including a plurality of cards, with each card within a set having a simple multiplication statement on the front side, and having an unstated answer which is the same answer as that of other cards within said set, and said plurality of decks of cards being divided into sub-pluralities of decks, each sub-plurality having a different level of difficulty and having distinctive indicia indicating the level of difficulty of said sub-plurality.

2. The teaching cards in accordance with claim 1 wherein each deck has a deck identifying indicia associated with it marked on it.

3. The teaching cards in accordance with claim 2 wherein said deck identifying indicia is marked on the front side of said cards.

4. The teaching cards in accordance with claim 1 wherein said indicia showing the level of each deck are identifying colors used on the back face of each card of each deck within said level.

5. The teaching cards in accordance with claim 1 where said deck identifying indicia is an alpha numeric character representing each deck.

6. The teaching cards in accordance with claim 1 where there are three levels of difficulty, and each level contains 4 decks of 36 cards each.

* * * * *